United States Patent [19]

Seitz et al.

[11] Patent Number: 5,049,886
[45] Date of Patent: Sep. 17, 1991

[54] WEATHER RADAR SYSTEM WITH IMPROVED DISPLAY CHARACTERISTICS

[75] Inventors: Thomas E. Seitz, Cedar Rapids; John G. Pensis; Daniel L. Woodell, both of Marion, all of Iowa

[73] Assignee: Rockwell International Corporation, El Segundo, Calif.

[21] Appl. No.: 589,309

[22] Filed: Sep. 26, 1990

[51] Int. Cl.[5] ............................................. G01S 9/66
[52] U.S. Cl. ..................................... 342/26; 342/185
[58] Field of Search .................. 342/26, 176, 177, 185

[56] References Cited

U.S. PATENT DOCUMENTS

| | | | |
|---|---|---|---|
| 3,683,373 | 8/1972 | Barnes et al. | 342/177 |
| 3,750,164 | 7/1973 | Anderson | 342/177 |
| 4,588,992 | 5/1986 | Clark | 342/176 |
| 4,754,279 | 6/1988 | Cribbs | 342/185 |
| 4,940,987 | 7/1990 | Frederick | 342/26 |

Primary Examiner—Mark Hellner
Attorney, Agent, or Firm—Gregory G. Williams; M. Lee Murrah; H. Frederick Hamann

[57] ABSTRACT

A weather radar system having improved display characteristics for rotation and translation of weather data where the rotations and translations are accomplished by converting data in a dedicated polar coordinate memory to display memories. The translation and rotation of the data between data updates is accomplished by referring to the data stored in the dedicated polar coordinate memory and thereby generating new rotated or translated data without requiring a manipulation plate of the data in the display memories.

2 Claims, 3 Drawing Sheets

WEATHER RADAR SYSTEM WITH IMPROVED DISPLAY CHARACTERISTICS

CROSS REFERENCE TO RELATED APPLICATIONS

This application relates to an application filed on the same date herewith by inventors John G. Pensis, Robert H. Saffell and Thomas E. Seitz which is entitled "Airborne Weather Radar Having RHI and PPI Display Modes" which is a continuation-in-part application of copending application by Robert H. Saffell having Ser. No. 07/413,923 entitled "Weather Radar System With Range-Height Display Capability". Both of the above referenced applications are hereby incorporated herein by these references.

FIELD OF THE INVENTION

This invention generally relates to airborne weather radar systems and more particularly concerns airborne weather radar systems having enhanced apparatus for and capability of processing weather radar data in order to provide for enhanced ability to display various types and configuration of weather radar data on a single display screen, and even more particularly concerns an apparatus for variably converting weather radar data into displayable data of differing configurations.

BACKGROUND OF THE INVENTION

Airborne weather radar systems which provide CRT screen displays showing weather information such as precipitation and/or turbulence in accordance with range and azimuth positions have come into wide spread use. The displays provided by these units follow the conventional planned position indicator (PPI) format of having range displayed radially outward from a central point at the bottom of the display and azimuth displayed across the screen along circular lines radially equal distance from the same central point. This type of display correlates with a sweep of a radar antenna through a range of azimuth positions as it scans the radar beam from side to side. The weather information provided by such weather radar system is extremely useful but it has been shown to be less than optimal, especially when range and height information are also desired, as suggested in the above referenced patent application. In order to accommodate both PPI and RHI weather radar information on the same display, it will be necessary to be able to move a standard PPI display to a different position on a display screen and simultaneously reduce the overall size of the PPI display.

Also, weather radar engineers are continuously developing new methods for detecting storm cells at greater distances and with greater accuracy. One of these new methods for improving storm detection involves substantially increasing the overall time for a weather radar antenna to make one complete scanning cycle. While this change does provide several advantages, it also has several drawbacks. One major drawback with a prolonged scan cycle is that the update rate for the new weather radar information is greatly reduced. Consequently, the forward motion of an aircraft and any turning maneuvers cause the standard PPI display to not accurately reflect the present situation outside of the aircraft. A translation or rotation of the data is needed to provide an appropriate representation of the relative position of any storm cells.

In the past, translations and rotations of the weather radar data have been accomplished by various means. However, there has frequently been a degradation of the display associated with each rotation or translation. Moreover, if several rotations or translations were necessary before a data update, the degradations associated with one rotation or translation would be incorporated into the next rotation or translation thereby compounding the degradation problems.

Consequently, there exists a need for improving the ability to move a standard PPI display to different positions on a display screen while comcomitantly allowing for a reduction or expansion of the overall size of the PPI display; and for translating and rotating weather radar data through a series of rotations and translations without compounding the display degradation.

SUMMARY

It is an object of the present invention to provide a weather radar system with enhanced display configuration abilities.

It is a feature of the present invention to include a variable Rho-Theta to X-Y data convertor.

It is an advantage of the present invention to allow the origin position of a PPI or RHI display to be variable over the display screen.

It is another advantage of the present invention to allow for expansion or reduction in the overall size of the PPI or RHI display.

It is another object of the present invention to provide an enhanced display of rotated and translated weather radar data.

It is another feature of the present invention to provide a Rho-Theta memory for storing received weather data in Rho-Theta format prior to any conversion to an X-Y format.

It is an advantage of the present invention to reduce the display degradation due to successive rotations and translations of the X-Y data.

The present invention provides an improved apparatus and method for providing real-time rotation and translation of weather radar data which is designed to satisfy the aforementioned needs, produce the earlier propounded objects, include the above described features and achieve the already articulated advantages. The invention is carried out in a "fixed origin-less" system in the sense that, the fixed display origin or center usually associated with standard PPI displays is eliminated. Instead, the PPI display is allowed to have a variable origin and consequently variable position on a display screen. The invention is also carried out in a "compounded display degradation-less" fashion, in the since that the display degradation that is associated with further rotating or translating weather radar data stored in X-Y memory that has been previously degraded by rotation or translation is eliminated. Instead, any second rotation or translation of weather data is accomplished by converting the undegraded original data in Rho-Theta memory to new data in X-Y memory.

Accordingly, the present invention relates to an apparatus including a weather radar data receiver, a Rho-Theta memory, a Rho-Theta convertor, a conversion processor, a first X-Y memory and a second X-Y memory.

BRIEF DESCRIPTION OF THE DRAWINGS

The invention may be more fully understood by reading the following description of the preferred embodiment of the invention in conjunction with the appended drawings wherein.

DETAILED DESCRIPTION

Figure 1:
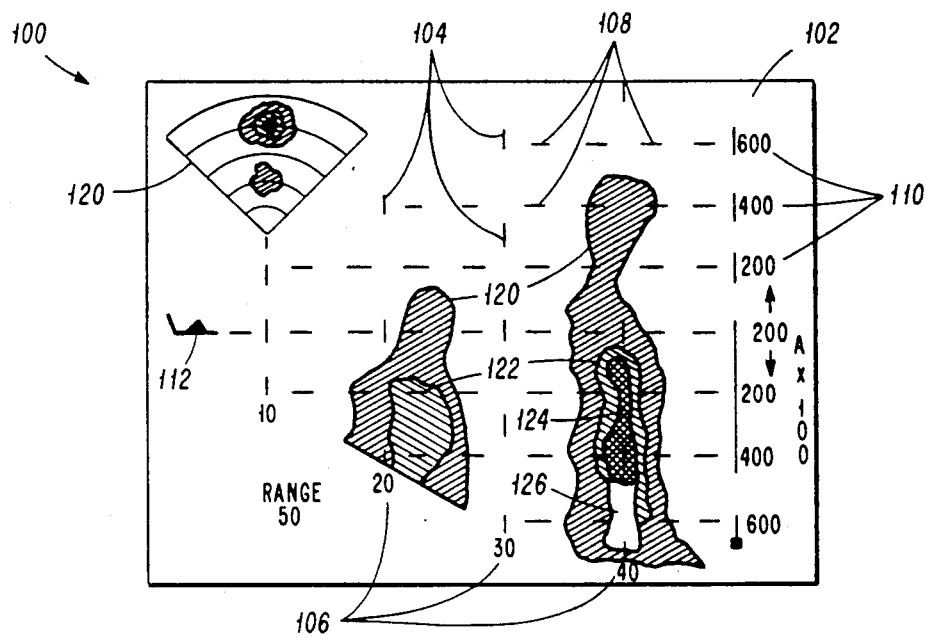
FIG. 1 is a combined RHI/PPI display, of the present invention where the PPI display is located in the upper left hand corner of the displayed device.

Now referring to FIG. 1, there is shown a combined RHI and PPI display which utilizes the rotation and translation apparatus of the present invention. The positioning and size reduction of the PPI display, in the upper left hand corner, is provided by the present invention as it is shown in FIG. 3 and is described in the accompanying text.

Figure 2:
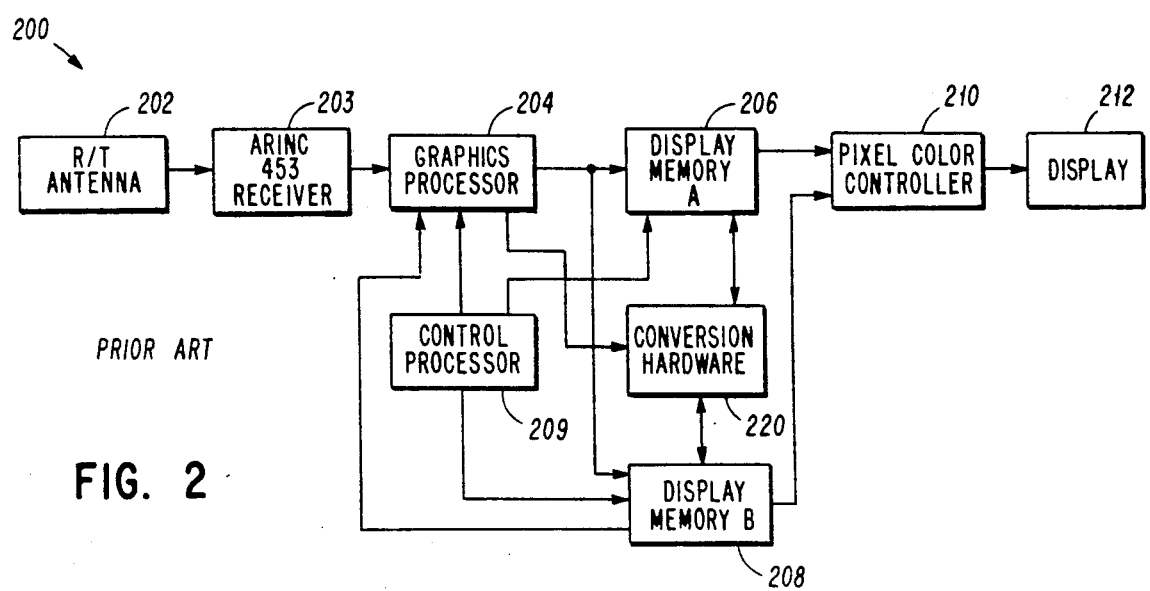
FIG. 2 is a block diagram of a weather radar system of the prior art.

Now referring to FIG. 2, there is shown a weather radar system, of the prior art, generally designated 200 which includes an R/T 202 which supplies signals to an ARINC receiver 203, which supplies signals to a graphics processor 204. It is in the graphics processor 204 that the polar coordinates are changed to rectangular coordinates and provided to memories 206 and 208. Display 212 is coupled to memory 206 and 208 through pixel and color controller 210. If a rotation or translation of the data in memory A 206 is needed, the graphics processor 204 generates the control signals necessary for the conversion hardware 220 to properly rotate or translate the information so that it corresponds to changes in the actual position or orientation of the aircraft. If additional rotation or translation is needed then it is read out of memory B 208 back through the conversion hardware 220 to memory A 206. Each rotation or translation results in a display degradation and it is in fact compounded because the once or twice degraded data is again rotated and translated and consequently further degraded.

In operation, to obtain a real-time representation of the weather phenomenom that exists ahead of an aircraft, the data that is received by the display hardware is rotated and translated. This movement is proprotional to the amount of aircraft movement that occurs between successive data updates. To accomplish this, received data is stored in a Rho-Theta format and then converted into an X-Y format and provided to buffered memories which act as refresh buffers for the Crt display. This process preferably occurs at least six times per second in order to generate an acceptable display. When rotation or translation of the data is necessary because of aircraft motion then the original data in Rho-Theta memory 312 is converted into one of the X-Y buffers and then provided to display 330. If further rotation or translation is necessary the data in refresh memory 324 and 326 is not operated upon to generate new data, as is done in the prior art, but, the new rotated or translated data is generated by referring to the original data in Rho-Theta memory 312. Consequently, the compounding of display degradations for successive rotation and translations between data updates is eliminated.

Figure 3:
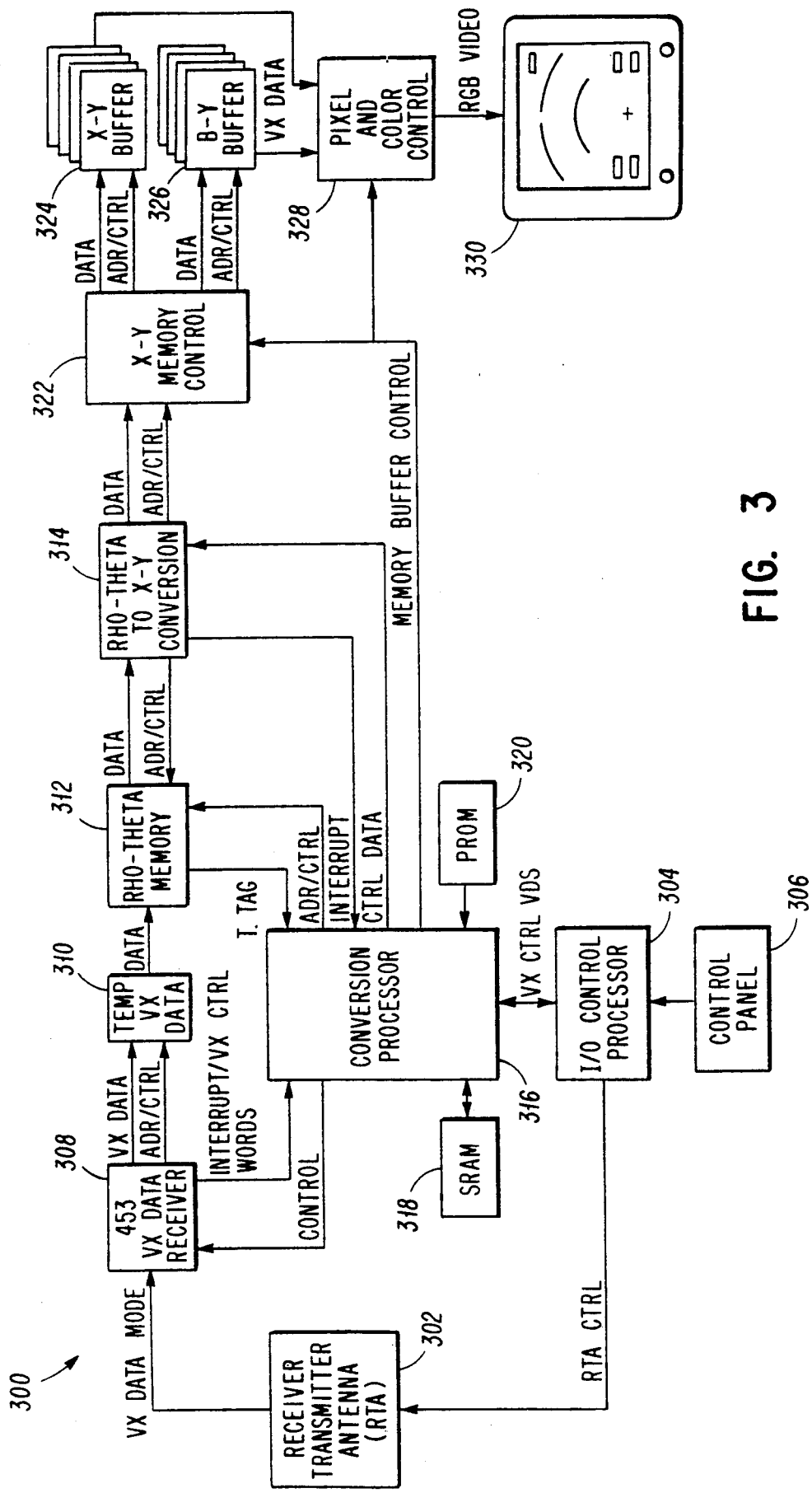
FIG. 3 is a block diagram of a weather radar system of the present invention including Rho-Theta memory and Rho-Theta convertor.

Now referring to FIG. 3, there is shown a weather radar system, of the present invention, generally designated 300. Receiver/Transmitter/Antenna assembly (RTA) 302, or the like, is well known in the art, and it is preferred that the assembly 302 monitors weather phenomenon ahead of the aircraft within an arc of +/−60° of the aircraft center line, by receiving echoes back from storm cells. Preferably, the RTA 302 transmits the weather data to the ARINC 453 weather data receiver 308 as 480 equally spaced radials (one every 0.25°) with each radial comprising 256 equally spaced data points or range bins. Also preferably transmitted with the weather data is mode/control data which includes the mode of operation and other information as desired by the system designer.

ARINC 453 receiver 308, may be a gate array, which is designed to accept the weather data/mode output of the RTA 302, or the like, and monitor the data and mode. After one full radial of information (i.e. all 256 bins and mode/control data) is received, receiver 308 stores the range bin information in the temporary weather data memory (RAM) and the mode/control information in internal registers then provides an interrupt command to conversion processor 316.

Conversion processor 316 is preferably an Intel 80C186 microprocessor. Processor 316 forms many functions but its main function is to control the execution of the weather data conversion that takes place in the Rho-Theta to X-Y converter 314 which is coupled to Rho-Theta memory 312. Other functions of processor 316 include processing the ARINC 453 data word output from receiver 308, driving the X-Y memory controller 322, determining RTA 302 operational mode and relaying information to the I/O control processor 304.

Conversion processor 316 is coupled with PROM 320 for program memory and SRAM 318 for processing memory.

After the conversion processor 316 receives the interrupt command from receiver 308, conversion processor 316 issues a control signal telling the Rho-Theta memory 312 where to accept new data from the temporary memory 310 for a new redial. Preferably, Rho-Theta memory 312 is a high speed static RAM memory array with each memory location in the array being made up of a data word that corresponds to a range bin received from RTA 302. After system intialization, or any time after the Rho-Theta memory is intialized, the base address of the PPI weather data will be located at 0,0 of the memory array. When data for the −60° scan angle is received, it will be written starting at 2,0 in Rho-Theta memory. Using this approach to data storage will leave two blank radials before data is stored in the array. When data for the 0° scan angle is received, it will be written starting at 242,0 in Rho-Theta memory. It can be seen that the starting point of any weather radial within the array can be computed as follows:

$$(X,0) \text{ where } X=[(\text{Scan Angle}+60)*4]+2$$

This approach works until aircraft rotation is considered. To allow accurate depiction of weather movement on the display 330, the data must be shifted left or right to reflect aircraft rotation. The easiest way to accomplish rotation of data is to shift the base address of the weather array each time a rotation increment is received by the conversion processor 316. Therefore, assuming that the current base address is 0,0 and a positive rotation increment (right turn) is received by the display 330, the new base address will be (1,0). Keeping this in mind, the starting point for each new radial received from the temporary memory 310 will be (X,0) where X=[(Scan Angle+60)*4]+2 +base address.

When data is converted from Rho-Theta to X-Y format, the base address that exists at the start of the video frame conversion will correspond to a conversion angle of −60.5°. The conversion will proceed at 0.25° increments until all 484 radials have been converted. Preferably 484 radials are converted instead of 480 because of the need to blank data at the edges of the display screen. Since the Rho-Theta memory is limited in size, the computed radial starting points must be limited to values between 0,0 and 483,0(480 radials containing weather data and 4 blank radials). If a computed value falls outside the acceptable range, it must be "wrapped around" to the other end of the acceptable range thus making the memory appear circular.

This approach should work properly, except when the aircraft turns more than 0.5°. When this occurs, data that is stored in the Rho-Theta memory 312 will be shifted from one side of the display 330 to the other side because of the circular nature of the memory. This problem can be solved by overriding the data that rotates off the screen with black data before accomplishing the conversion process. In other words, if a positive rotation increment (right turn) is received, the data that appeared on the left side of the screen will be over written with black. The offset for the radial to be overwritten can be determined from the fact that there will always be a minimum of two blank radials on each side of the base address. Therefore, the overwritten radial can be computed as:

(X1,0) where X1=base address+/−2

(Add for a negative rotation increment and subtract for a positive increment.) The data output to Rho-Theta convertor 314 and the overall conversion process may be more fully understood by referring to FIG. 4 and its accompany text. However, the essence of the Rho-Theta to X-Y conversion is that, in an interactive process, all the data packets (one for each range bin) are assigned new addresses in X-Y coordinates. The actual data packet without addresses in unchanged.

Generally, the data from the Rho-Theta memory 312 and the new X-Y address is then provided to X-Y memory control 322 which is preferably a video ram controller. X-Y memory controller 322 performs with commands from the conversion processor 316 the function of controlling whether the data is to be stored in first X-Y buffered memory 324 or second X-Y buffered memory 326. Each buffered memory is preferably a 256X256 VRAM. When one buffered memory is receiving data from the memory control 322 the other buffered memory is serving as a refresh memory for the display 330. The weather data is then provided to the display 330 by way of pixel color control 328 which is preferably a programmed logic array and performs the function of decoding range bin color data.

Figure 4:
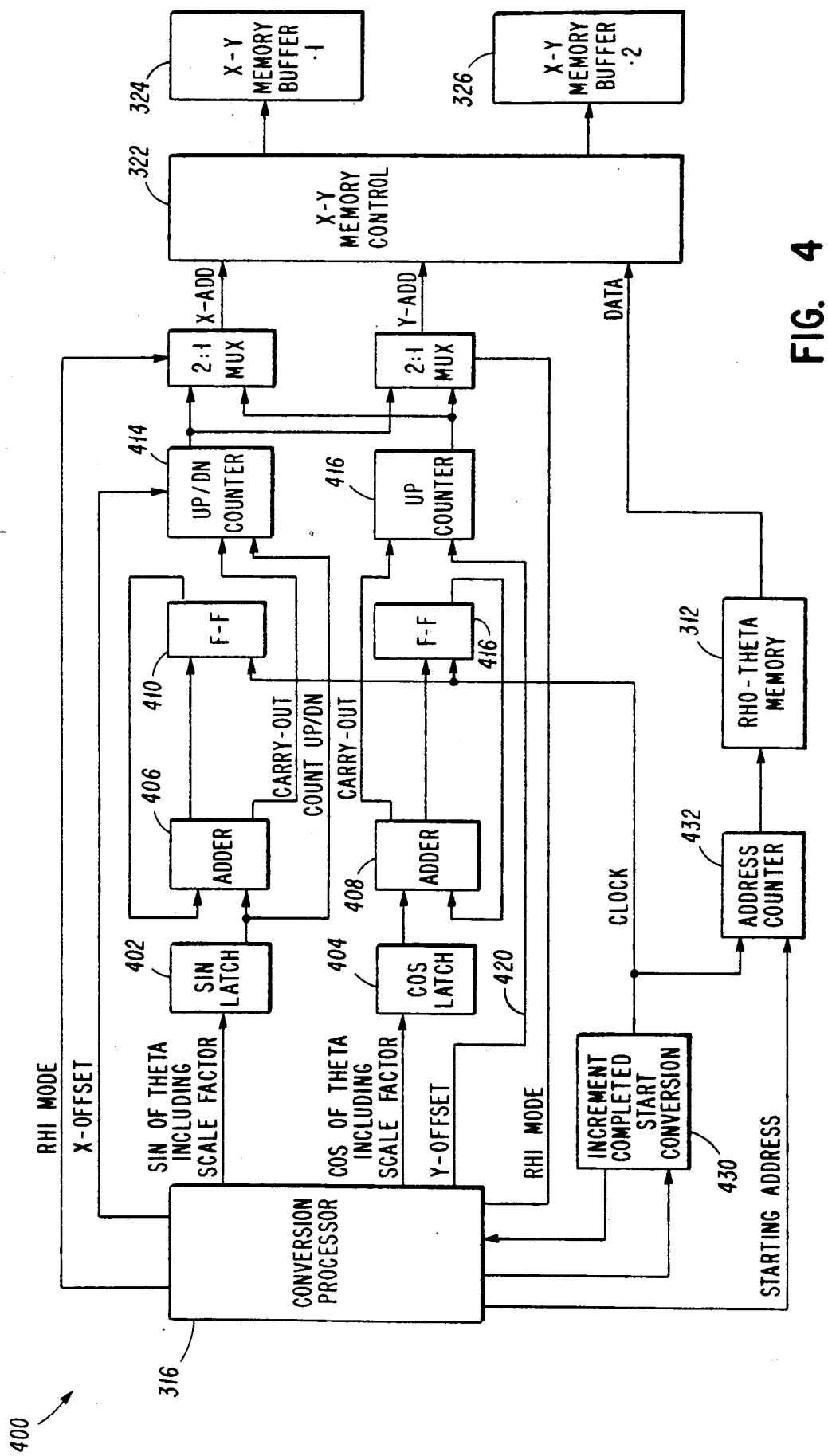
FIG. 4 is a block diagram of a circuit of the present invention for converting Rho-Theta coordinates to cartesian coordinates.

Now referring to FIG. 4, there is shown a circuit diagram for the Rho-Theta to X-Y converter 314 (FIG. 3), generally designated 400. It is contemplated that the diagram FIG. 4 could be implemented in either hardware or software.

To convert the data addresses, the conversion processor 316 loads the sine and cosine value (multiplied by a variable scale factor) for each azimuth line to be converted into the respective hardware latches 402 and 404. This is done one azimuth line at a time with each conversion being started by the conversion processor 316. The output from latches 402, 404 along with a registered output from the respective adders 406 and 408 are the respective adder inputs. The registered outputs are provided by data registers 410 and 412 respectively. Increment clock 430 provides signals to registers 410, 412 and address counter 432, so that, they remain synchronized during the conversion of each radial. Conversion processor 316 starts the conversion process by issuing a start command to increment clock 430 which in turn issues a conversion completed message when each radial is converted. A carry out from the most significant bit (MSB) of each respective adder will act as a clock input and increment/decrement the 8 bit counters 414 and 416 respectively. The output of counters 414 and 416 represents the X or Y address of the particular range bin. This process continues until the X-Y address of all 256 range bins have been obtained.

The X and Y offsets are used to relocate the apex or center of the displayed data. Translation of the data is accomplished by adjusting the Y offset 420 before a radial is converted. The conversion processor 316 receives aircraft position information from an external source, such as the RTA 302 a GPS receiver (not shown), etc. and generates translation tags which are attached to each radial of data when stored in the Rho-Theta memory 312. Consequently, a component of the data in Rho-Theta memory relates to the aircraft position at the time of data storage. When translation occurs the conversion processor 316 compares the position information or translation tag for the radial to be read out of Rho-Theta memory 312 with the then current aircraft position and generates the appropriate Y offset 420. This will have the affect of moving the data towards the bottom of the display at a rate proportional to the aircrafts speed.

Rotation is accomplished by manipulating the Rho-Theta memory 312 array (FIG. 3). Data is stored sequentially in the Rho-Theta memory 312 starting with the azimuth line corresponding to the left most antenna scan angle. The address associated with left most azimuth line is labeled base address by conversion processor 316. When the conversion processor 316 determines that rotation is necessary by referring to external sources of rotation rate such as an inertial navigation system, an air data system or inPut from the RTA, the base address is incremented/decremented which is equivalent to changing the scan angle of each azimuth line in the Rho-Theta memory 312. Therefore, when the data is converted, the data will rotate left or right corresponding to the amount of rotation that has been commanded by the conversion processor 316 which correlates to the actual rotation of the aircraft.

Unlike PPI data, only one radial of RHI data is stored in Rho-Theta memory and it is then immediately converted to both of the X-Y buffers. The only difference is that the apex of the display is rotated 90° clockwise form the PPI display. This is accomplished by converting the data using the above described procedure, except that the results of the sine conversion act as the Y address, instead of the X address, and the cosine conversion results act as the X address, instead of the Y address. The RHI display represents a vertical weather profile of a single verticle plane somewhere within the normal antenna sweep range. Since nothing is known about the weather on either side of the particular verticle section of weather, rotation cannot be accomplished in the RHI mode. Similarly, due to the aircrafts forward velocity, translation cannot be accomplished, unless the vertical scan is in line with the aircraft center line and its direction of motion because each successive RHI antenna sweep will result in data being taken from a new verticle section.

Simultaneous display of RHI and PPI data, as shown in FIG. 1, can be accomplished by a combination of the above two processes. As stated earlier, the X and Y offsets can be used to move the apex of the displayed data to different locations within the X-Y memory buffers 324 and 326. The sine/cosine variable scale factors can be used to adjust the frequency at which a carry out occurs form each of the adder blocks 406, 408. This in turn will control the size of the display area within the X-Y buffers 324 and 326. Therefore, by accomplishing two conversions (one each for PPI and RHI), and manipulating the X-Y offsets and the sine/cosine variable scale factors, display of both RHI and PPI data can be accomplished on a single video screen 330.

While particular embodiments of the present invention have been shown and described, it should be clear that changes and modifications may be made to such embodiments without departing from the true scope and spirit of the invention. It is intended that the appended claims cover all such changes and modifications.

We claim:

1. An improved airborne weather radar system comprising:
   receiver and transmitter means for transmitting and receiving radar signals;
   temporary storage means for storing weather data received by said receiver and transmitter means;
   a Rho-Theta memory, coupled with said temporary storage means, for storing said weather data in a Rho-Theta format;
   conversion processor means for controlling said Rho-Theta memory,
   Rho-Theta to X-Y conversion means for variable conversion of addresses associated with said weather data in said Rho-Theta memory from said Rho-Theta format to an X-Y format, in response to a command from said conversion processor means;
   means for providing an air speed signal and an aircraft rotation signal to said conversion processor means;
   said conversion processor means further for variable conversion of said addresses in response to said air speed signal and said aircraft rotation signal;
   means for storing weather data in an X-Y format, which is coupled with said conversion means; and
   display means for displaying said weather data in said X-Y format, which is coupled with said means for storing weather data in an X-Y format.

2. An improved airborne weather radar system comprising:
   a receiver/transmitter for transmitting and receiving radar signals to and from distant storm cells, said receiver further generating weather data signals in a Rho-Theta format in response to receiving said radar signals;
   an ARINC 453 receiver means, coupled with said receiver/transmitter, for receiving said weather data signals and issuing an interrupt signal after receiving a predetermined amount of said weather data signals, and further for outputting said weather data signals together with corresponding address and control signals;
   a temporary memory, coupled with said ARINC 453 receiver means, for storing said weather data with corresponding address and control signals;
   a Rho-Theta memory, coupled with said temporary memory, having a plurality of memory locations therein for storing said weather data with corresponding addressing control signals and further for storing additional information;
   a conversion processor coupled with said ARINC 453 receiver means and said Rho-Theta memory for receiving said interrupt signal and generating a translation tag which corresponds to an aircraft position at a given time, said conversion processor issuing commands to said Rho-Theta memory to store said weather data with corresponding addressing control signals at a particular memory location in said Rho-Theta memory together with said translation tag;
   a Rho-Theta to X-Y convertor, coupled with said Rho-Theta memory and said conversion processor for converting said weather data in Rho-Theta format to X-Y formatted weather data;
   a first display memory for storing X-Y formatted weather data;
   a second display memory for storing X-Y formatted weather data; and
   an X-Y memory controller, coupled with said Rho-Theta to X-Y convertor, said conversion processor, and said first and second disPlay memories, said memory controller for controlling the input of X-Y formatted weather data to said first and second display memories.

* * * * *